United States Patent
Tamura et al.

(10) Patent No.: US 9,070,915 B2
(45) Date of Patent: Jun. 30, 2015

(54) HYDROGEN GENERATOR, OPERATING METHOD OF HYDROGEN GENERATOR, AND FUEL CELL SYSTEM

(71) Applicant: PANASONIC CORPORATION, Osaka (JP)

(72) Inventors: Yoshio Tamura, Hyogo (JP); Koichi Kusumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 267 days.

(21) Appl. No.: 13/989,325

(22) PCT Filed: Oct. 3, 2012

(86) PCT No.: PCT/JP2012/006361
§ 371 (c)(1),
(2) Date: May 23, 2013

(87) PCT Pub. No.: WO2013/057891
PCT Pub. Date: Apr. 25, 2013

(65) Prior Publication Data
US 2014/0057185 A1 Feb. 27, 2014

(30) Foreign Application Priority Data

Oct. 20, 2011 (JP) ................. 2011-231044

(51) Int. Cl.
*H01M 8/04* (2006.01)
*H01M 8/02* (2006.01)
(Continued)

(52) U.S. Cl.
CPC ...... *H01M 8/04664* (2013.01); *H01M 8/04955* (2013.01); *H01M 8/0612* (2013.01);
(Continued)

(58) Field of Classification Search
CPC ............... H01M 8/04664; H01M 8/04955; H01M 8/0612; H01M 8/0675; H01M 8/04425; H01M 8/04686; C01B 3/38; C01B 2203/066; C01B 2203/0244; C01B 2203/0261
See application file for complete search history.

(56) References Cited

U.S. PATENT DOCUMENTS 4,098,960 A 7/1978 Gagnon
5,686,196 A 11/1997 Singh et al.
(Continued)

FOREIGN PATENT DOCUMENTS

JP 10-092452 A 4/1998
JP 2003-236393 A 8/2003
(Continued)

OTHER PUBLICATIONS

International Search Report issued in International Patent Application No. PCT/JP2012/006361 mailed on Jan. 8, 2013.
(Continued)

*Primary Examiner* — Kenneth Douyette
(74) *Attorney, Agent, or Firm* — McDermott Will & Emery LLP

(57) ABSTRACT

A hydrogen generator associated with the invention comprises a hydro-desulfurizer (1) configured to remove sulfur compounds from a raw material; a reformer (2) configured to generate hydrogen-containing gas with use of the raw material that has passed through the hydro-desulfurizer (1); a raw material supply device (3) configured to supply the raw material to the reformer (2); a recycle flow passage (4) configured to supply a portion of the hydrogen-containing gas, discharged from the reformer (2), to the raw material before the raw material flows into the hydro-desulfurizer (1); an on-off valve (5) provided in the recycle flow passage (4); a pressure detector (6) located at a position upstream of the on-off valve (5) in the recycle flow passage (4); and an abnormality detector (7) configured to detect an abnormal clogging in the recycle flow passage (4) based on a pressure detected by the pressure detector (6), in a state in which the raw material supply device (3) is supplying the raw material to the reformer (2) with the on-off valve (5) closed.

11 Claims, 11 Drawing Sheets

(51) Int. Cl.
  *H01M 8/22* (2006.01)
  *H01M 8/06* (2006.01)
  *C01B 3/38* (2006.01)

(52) U.S. Cl.
  CPC ........ *H01M8/0675* (2013.01); *H01M 8/04425* (2013.01); *H01M 8/04686* (2013.01); *Y02E 60/50* (2013.01); *C01B 2203/066* (2013.01); *C01B 3/38* (2013.01); *C01B 2203/0233* (2013.01); *C01B 2203/0244* (2013.01); *C01B 2203/0261* (2013.01); *C01B 2203/0283* (2013.01); *C01B 2203/127* (2013.01); *C01B 2203/148* (2013.01); *C01B 2203/169* (2013.01)

(56) References Cited

U.S. PATENT DOCUMENTS 6,733,552 B1 * 5/2004 Taguchi et al. .............. 48/127.9
2001/0047622 A1 * 12/2001 Yamaoka et al. ........... 48/197 R
2005/0208357 A1 * 9/2005 Bitzer et al. .................... 429/34
2006/0159970 A1   7/2006 Kato et al.
2009/0011299 A1 * 1/2009 Yokoyama ...................... 429/20
2011/0003214 A1   1/2011 Foley et al.
2012/0040256 A1   2/2012 Kani et al.

FOREIGN PATENT DOCUMENTS

JP    2006-104003 A    4/2006
JP    2011-195391 A    10/2011

OTHER PUBLICATIONS

Extended European Search Report dated Nov. 25, 2014, in corresponding European Application No. 12842310.0.

* cited by examiner

HYDROGEN GENERATOR, OPERATING METHOD OF HYDROGEN GENERATOR, AND FUEL CELL SYSTEM

RELATED APPLICATIONS

This application is the U.S. National Phase under 35 U.S.C. §371 of International Application No. PCT/JP2012/006361, filed on Oct. 3, 2012, which in turn claims the benefit of Japanese Application No. 2011-231044, filed on Oct. 20, 2011, the disclosures of which Applications are incorporated by reference herein.

TECHNICAL FIELD

The present invention relates to a hydrogen generator and a fuel cell system.

BACKGROUND ART

Fuel cell systems generate electric power, using hydrogen-containing gas as a fuel and air as an oxidizing gas. Since there is no infrastructure for supplying hydrogen which is put in place, a hydrogen generator having a reformer is generally used for generating hydrogen-containing gas through a reforming reaction in which natural gas, LPG or the like is used as a raw material.

As the reforming reaction, various methods such as partial oxidation reforming, autothermal reforming and steam reforming are known. The steam reforming reaction, for example, occurs between natural gas serving as a raw material and water vapor in the presence of a Ni or Ru precious-metal-based reforming catalyst at high temperatures of about 600 to 700° C., so that hydrogen-containing gas, which contains hydrogen as a main component, is yielded.

The material gas such as natural gas contains sulfuric compounds which are required to be removed with some sort of method because they are poisoning substances particularly to the reforming catalyst. One known technique for removing the sulfuric compounds is a hydrodesulfurization method that utilizes recycled hydrogen-containing gas.

There has heretofore been proposed a hydrogen generator according to which a recycle flow passage for recycling the hydrogen-containing gas is provided with a temperature detector that detects occurrence of a clogging in the recycle flow passage (see e.g., Patent Literature 1).

CITATION LIST

Patent Literature

Patent Literature 1: Japanese Laid-Open Patent Application No. Hei. 10-92452

SUMMARY OF INVENTION

Technical Problem

The hydrogen generator disclosed in Patent Literature 1 has, however, revealed the problem that temperature fluctuations due to variations in the flow rate do not appear conspicuously, which sometimes makes it difficult to detect a clogging in the flow passage.

The invention is directed to overcoming the foregoing problem and therefore an object of the invention is to provide a hydrogen generator and a fuel cell system which are capable of making it easier to detect an abnormal clogging in the recycle flow passage compared to the prior arts.

Solution to Problem

The inventors have found that it is possible to detect an abnormal clogging in a recycle flow passage by a pressure detector in a hydrogen generator equipped with a hydro-desulfurizer. After making intensive researches on clogging detection systems and methods, they obtained the following results.

According to the hydrogen generator disclosed in Patent Literature 1, as the atmospheric temperature of the hydrogen generator is higher, the amount of heat released from the recycle flow passage is smaller, so that temperature fluctuations caused by variations in the flow rate of gas in the recycle flow passage becomes lessened. Since the temperature fluctuations are less as described above, a clogging in the recycle flow passage cannot be detected in some cases, even when an attempt is made to detect a clogging in the recycle flow passage on the basis of the temperature fluctuations in the recycle flow passage using the temperature detector provided in the recycle flow passage.

In overcoming the above problem, there has been provided, in accordance with the invention, a hydrogen generator comprising: a hydro-desulfurizer configured to remove sulfur compounds from a raw material; a reformer configured to generate hydrogen-containing gas with use of the raw material that has passed through the hydro-desulfurizer; a raw material supply device configured to supply the raw material to the reformer; a recycle flow passage configured to supply a portion of the hydrogen-containing gas, discharged from the reformer, to the raw material before the raw material flows into the hydro-desulfurizer; an on-off valve provided in the recycle flow passage; a pressure detector located at a position upstream of the on-off valve in the recycle flow passage; and an abnormality detector configured to detect an abnormal clogging in the recycle flow passage based on a pressure detected by the pressure detector, in a state in which the raw material supply device is supplying the raw material to the reformer, with the on-off valve closed.

According to the invention, there has been provided a fuel cell system which includes the above-described hydrogen generator and a fuel cell that generates electric power, using the hydrogen-containing gas supplied by the hydrogen generator.

Advantageous Effects of Invention

The invention makes it possible to more easily detect an abnormal clogging in the recycle flow passage as compared to the previous techniques.

DESCRIPTION OF EMBODIMENTS

Referring now to the accompanying drawings, preferred embodiments of the invention will be described. In all these figures, those parts that are substantially equivalent or function substantially similarly to one another are indicated by the same numerals and needless repetition of description is avoided. In all these figures, constituent elements necessary for explanation of the invention are selectively shown whereas other elements are omitted. It should further be noted that the invention is not limited to the embodiments herein shown.

First Embodiment

A hydrogen generator according to Embodiment 1 comprises a hydro-desulfurizer configured to remove sulfur compounds from a raw material; a reformer configured to generate hydrogen-containing gas with use of the raw material that has passed through the hydro-desulfurizer; a raw material supply device configured to supply the raw material to the reformer; a recycle flow passage configured to supply a portion of the hydrogen-containing gas, discharged from the reformer, to the raw material before the raw material flows into the hydro-desulfurizer; an on-off valve provided in the recycle flow passage; a pressure detector located at a position upstream of the on-off valve in the recycle flow passage; and an abnormality detector configured to detect an abnormal clogging in the recycle flow passage based on a pressure detected by the pressure detector, in a state in which the raw material supply device is supplying the raw material to the reformer, with the on-off valve closed.

The above configuration makes it easier to detect the presence or absence of a flow of hydrogen-containing gas within the recycle flow passage, as compared to the previous hydrogen generators.

In the above hydrogen generator, the abnormality detector may close the on-off valve in its open state in a state in which the reformer is generating the hydrogen-containing gas and detect an abnormal clogging based on a pressure detected by the pressure detector after the closing of the on-off valve.

The above configuration makes it easier to detect the presence or absence of a flow of recycled gas within the recycle flow passage, as compared to the case where the on-off valve is not closed.

Configuration of Hydrogen Generator

Figure 1:
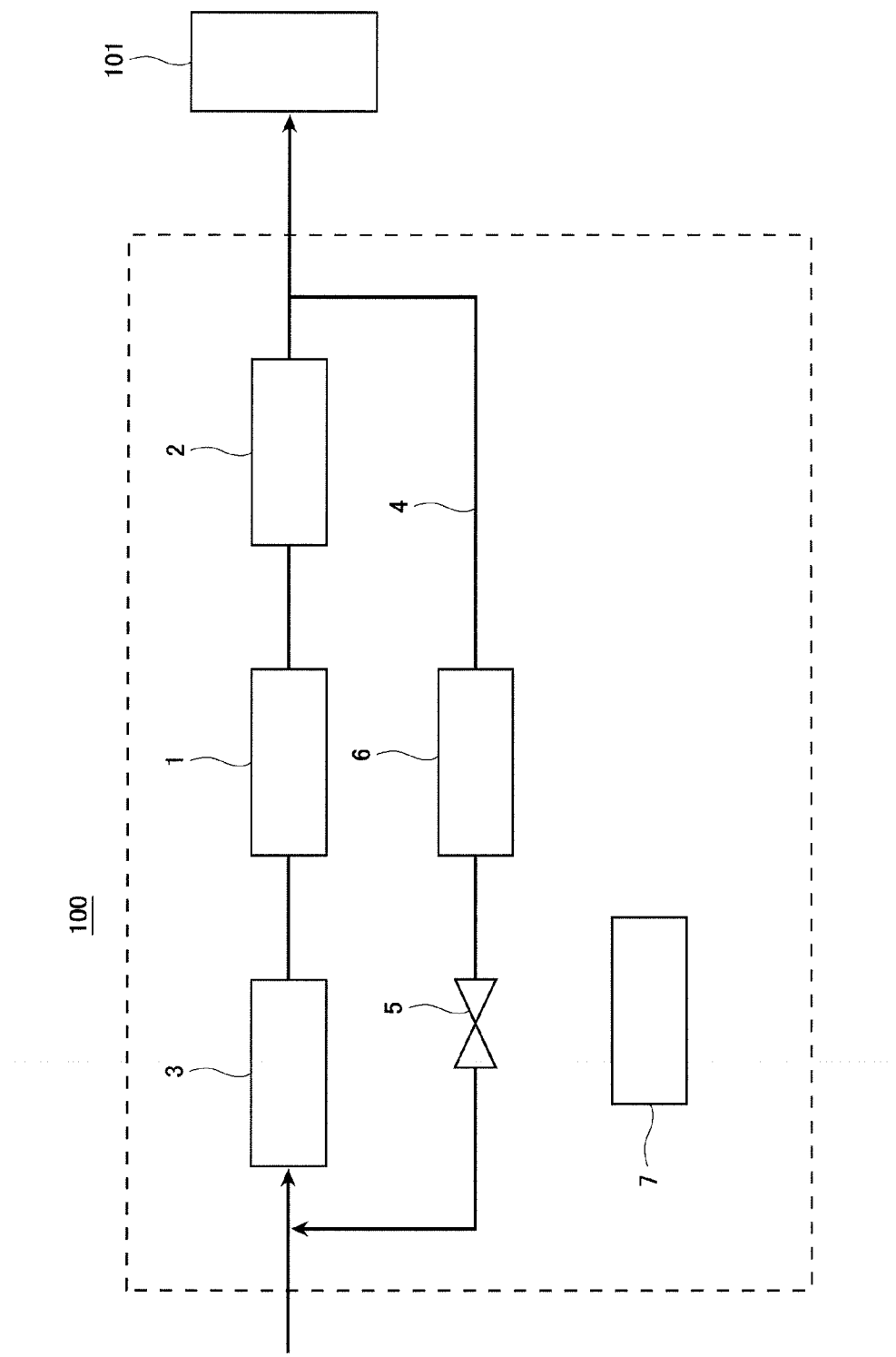
FIG. 1 is a conceptual diagram showing one example of the schematic configuration of a hydrogen generator according to a first embodiment.

FIG. 1 is a conceptual diagram showing one example of the schematic configuration of the hydrogen generator according to the first embodiment.

In the example shown in FIG. 1, the hydrogen generator 100 of this embodiment includes a hydro-desulfurizer 1, a reformer 2, a raw material supply device 3, a recycle flow passage 4, an on-off valve 5, a pressure detector 6 and an abnormality detector 7.

The hydro-desulfurizer 1 is configured to remove sulfur compounds from the raw material gas to be supplied to the reformer 2. The hydro-desulfurizer 1 has a container filled with a desulfurization agent for use in hydrodesulfurization. As the desulfurization agent for hydrodesulfurization, a Cu/Zn-based catalyst is used which has both the function of converting sulfur compounds to hydrogen sulfide and the function of adsorbing hydrogen sulfide. It should be noted that the hydrodesulfurization agent is not limited to the above example but may be composed of: a Co/Mo-based catalyst for converting the sulfur compounds contained in the material gas to hydrogen sulfide; and a ZnO-based catalyst or Cu/Zn-based catalyst that is a sulfur adsorbing agent provided on a downstream side of the Co/Mo-based catalyst, for adsorbedly removing the hydrogen sulfide.

The reformer 2 is configured to generate hydrogen-containing gas, using the material gas. More specifically, the material gas causes a reforming reaction in the presence of a reforming catalyst (not shown) within the reformer 2, so that hydrogen-containing gas is generated. The reforming reaction adopted herein may be of any type, and representative examples of the reforming reaction include steam reforming reaction, autothermal reforming reaction and partial oxidation reaction etc. The hydrogen-containing gas generated in the reformer 2 is supplied, by way of a proper flow passage, to a "hydrogen-utilizing device" 101 that utilizes hydrogen. As the hydrogen-utilizing device 101, a hydrogen tank, a fuel cell or the like may be used.

Although not shown in FIG. 1, appropriate components necessary for causing any of the above-listed reforming reactions are installed appropriately. In cases where steam reforming is the reforming reaction for instance, a combustion chamber for heating the reformer, an evaporator for generating water vapor, and a water supply device for supplying water to the evaporator are installed. In cases where autothermal reforming is the reforming reaction, the hydrogen generator 100 is further provided with an air supply device (not shown) for supplying air to the reformer. As the material gas, a gas containing an organic compound composed of at least carbon and hydrogen (e.g., natural gas containing methane as a main component, and LPG) may be used.

The raw material supply device 3 adjusts the flow rate of the raw material to be supplied to the reformer 2. The raw material supply device 3 may be composed of, for example, a booster and a flow regulating valve or composed of either of them. A fixed displacement pump, for example, is employed as the booster but the booster is not limited to this. The raw material is supplied from a raw material supply source. The raw material gas source has a specified supply pressure, and representative examples of the raw material gas source include raw material gas cylinders, material gas infrastructure and the like.

The recycle flow passage 4 is used for supplying the hydrogen-containing gas from the reformer 2 to the raw material existing in the raw material supply device 3 that is located on an upstream side of the hydro-desulfurizer 1. The upstream end of the recycle flow passage 4 may be connected to an arbitrary position of a flow passage as long as the hydrogen-containing gas going out of the reformer 2 flows into the flow passage.

In cases where a CO reducing unit for reducing the amount of carbon monoxide contained in the hydrogen-containing gas is provided on a downstream side of the reformer 2 for example, the upstream end of the recycle flow passage 4 may be connected to the flow passage extending between the reformer 2 and the CO reducing unit, to the CO reducing unit, or to a downstream side of the CO reducing unit. If the CO reducing unit includes a shift converter for reducing the amount of carbon monoxide through a shifting reaction and a CO removal device for reducing the amount of carbon monoxide through at least either an oxidation reaction or methanation reaction, the upstream end of the recycle flow passage 4 may be connected to the flow passage between the shift converter and the CO removal device. It is also possible to connect the upstream end of the recycle flow passage 4 to the flow passage (not shown) on a downstream side of the hydrogen-utilizing device that utilizes the hydrogen-containing gas.

The on-off valve 5 is provided in the recycle flow passage 4, which is closed to stop the hydrogen-containing gas flowing within the recycle flow passage 4 and opened to allow the hydrogen-containing gas to flow within the recycle flow passage 4. The on-off valve 5 may be operated by electric power like solenoid valves or operated by gas pressure. The on-off valve 5 may be of any configuration as long as it can close and open the flow path of the gas within the recycle flow passage 4.

The pressure detector 6 is configured to detect a pressure in a portion of the recycle passage 4 which is located upstream of the on-off valve 5, in a direction of the flow of the hydrogen-containing gas in the recycle flow passage 4. The provision of the pressure detector 6 on an upstream side of the on-off valve 5 makes it possible to detect, when the on-off valve 5 is opened, an abnormal clogging which has occurred in a portion the recycle flow passage 4 which is downstream of the pressure detector 6 and to detect, when the on-off valve 5 is closed, an abnormal clogging which has occurred in a portion of the recycle flow passage 4 which is located upstream of the pressure detector 6. This enables detection of abnormal clogging that occur all over the region of the recycle flow passage 4.

The abnormality detector 7 detects occurrence of an abnormal clogging in the recycle flow passage 4 based on a pressure detected by the pressure detector 6, in a state in which the raw material supply device 3 is supplying the raw material to the reformer 2 with the on-off valve closed 5.

The abnormal clogging herein may be defined as a state where the flow of the hydrogen-containing gas within the recycle flow passage 4 is completely shut out or defined as a state where at least a portion of the recycle flow passage 4 is clogged so that the flow volume of the hydrogen-containing gas decreases compared to the state where the recycle flow passage 4 is not clogged. This means that the degree of clogging in the recycle flow passage 4 may be arbitrarily set.

The abnormality detector 7 used herein may be of any type as long as it has the function of detecting an abnormal clogging in the recycle flow passage 4. The abnormality detector 7 includes, for example, an arithmetic operation unit (not shown) and a storage unit (not shown) for storing an abnormality detection program. Examples of the arithmetic operation unit include MPU and CPU. Examples of the storage unit include memories. It should be noted that the abnormality detector 7 may consist of a single abnormality detector or may be constituted by a plurality of abnormality detectors that cooperate to each other to perform abnormality detection.

Operation of Hydrogen Generator

Figure 2:
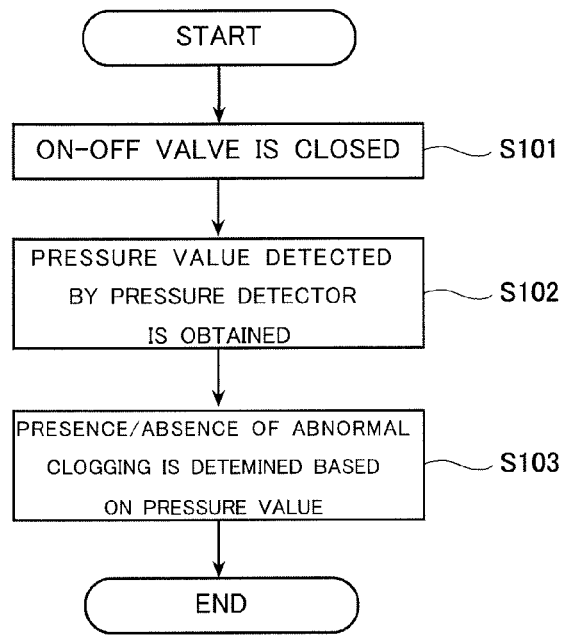
FIG. 2 is a flow chart showing one example of the schematic operation of the hydrogen generator according to the first embodiment.
Figure 3:
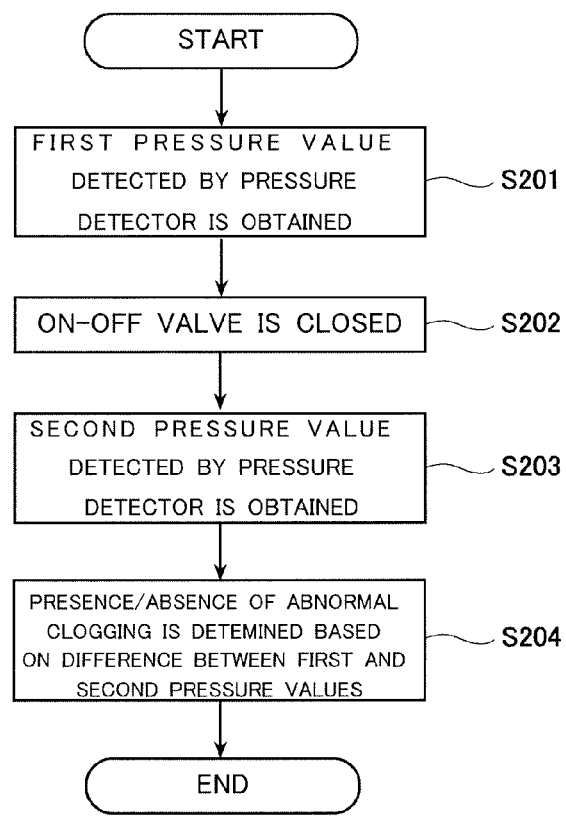
FIG. 3 is a flow chart showing another example of the schematic operation of the hydrogen generator according to the first embodiment.

Reference is made to FIGS. 2 and 3 to describe the operation of the hydrogen generator 100. The hydrogen generating operation of the hydrogen generator 100 is performed similarly to those of the previous hydrogen generators and therefore a detailed description thereof is omitted while only the operation of detecting an abnormal clogging in the recycle flow passage 4 is explained in the following description.

FIG. 2 is a flow chart showing one example of the schematic operation of the hydrogen generator according to the first embodiment.

In the hydrogen generator 100, in a state in which the reformer 2 is generating hydrogen-containing gas, the on-off valve 5 is opened to allow the hydrogen-containing gas to flow in the recycle flow passage 4 (START).

As shown in FIG. 2, the abnormality detector 7 closes the on-off valve 5 (STEP S101). Then, the abnormality detector 7 obtains a pressure value detected by the pressure detector 6 (STEP S102) and determines the presence or absence of an abnormal clogging in the recycle flow passage 4 based on the obtained pressure value (STEP S103).

The abnormality detector 7 determines the presence or absence of an abnormal clogging in the recycle flow passage 4, for example, by determining whether the pressure value obtained at STEP 102 is lower than a first threshold value at STEP 103. More specifically, if the above pressure value is lower than the first threshold value, it is then determined that an abnormal clogging has occurred in the recycle flow passage 4, whereas if the above pressure value is equal to or higher than the first threshold value, it is then determined that no abnormal clogging has occurred in the recycle flow passage 4.

In the operation flow described above, since the determination as to the presence or absence of an abnormal clogging is based on a pressure detected by the pressure detector 6 with the on-off valve 5 closed, the presence or absence of an abnormal clogging in a portion of the recycle flow passage 4 which is located upstream of the pressure detector 6 can be determined without being affected by pressure fluctuations caused by variations in the flow rate of the hydrogen-containing gas flowing in the recycle flow passage 4.

As the first threshold value, a value, which is higher than a pressure value in the downstream end of the recycle flow passage 4 and equal to or lower than a pressure value in the upstream end of the recycle flow passage 4, is set. The first threshold value may be set to, for example, a value that is equal to or lower than a minimum pressure value in the upstream end of the recycle flow passage 4 and higher than a pressure value in the downstream end of the recycle flow passage 4 when the pressure in the upstream end has the minimum value. This enables detection of an abnormal clogging irrespective of the amount of the raw material supplied from the raw material supply device 3 to the reformer 2.

The first threshold value is not necessarily limited to the above values but may be set to any value as long as the presence or absence of an abnormal clogging in the portion of the recycle flow passage 4 which is located upstream of the pressure detector 6 can be determined.

While there has been hereinbefore described a method in which the detection of an abnormal clogging in the recycle flow passage 4 is based on the absolute value of pressure detected by the pressure detector 6, a method of detecting an abnormal clogging based on the variation width of pressure will be described below.

FIG. 3 is a flow chart showing another example of the schematic operation of the hydrogen generator according to the first embodiment.

First, the hydrogen generator 100 is in a state where the reformer 2 generates the hydrogen-containing gas and the on-off valve 5 is opened to allow the hydrogen-containing gas to flow in the recycle flow passage 4 (START).

As shown in FIG. 3, the abnormality detector 7 obtains a first pressure value that is detected by the pressure detector 6 with the on-off valve 5 opened (STEP S201). Then, the abnormality detector 7 closes the on-off valve 5 (STEP S202) and obtains a second pressure value detected by the pressure detector 6 (STEP S203). The abnormality detector 7 then determines the presence or absence of an abnormal clogging in the recycle flow passage 4 based on the difference between the second pressure value obtained at STEP S203 and the first pressure value obtained at STEP S201 (STEP S204).

The abnormality detector 7 determines, at STEP S204, the presence or absence of an abnormal clogging in the recycle flow passage 4, for example, based on whether the above pressure difference is not lower than the second threshold value. More specifically, if the above pressure difference is lower than the second threshold value, it is then determined that an abnormal clogging has occurred in the recycle flow passage 4, whereas if the above pressure difference is equal to or higher than the second threshold value, it is then determined that no abnormal clogging has occurred in the recycle flow passage 4.

The second threshold value is set to a value that is lower than a pressure loss from the upstream end of the recycle flow passage 4 to the pressure detector 6 when the on-off valve 5 is opened and higher than zero. For example, as the second threshold value, a value, which is equal to or lower than the minimum value of the above pressure loss and higher than zero, may be set.

The second threshold value is arbitrarily set according to what degree of clogging in the recycle flow passage 4 is regarded as abnormal clogging. For instance, in cases where slight clogging, which allows flow of the hydrogen-containing gas in the recycle flow passage 4 in amounts greater than required for hydrodesulfurization, is regarded as abnormal clogging in the recycle flow passage 4, the second threshold value is set to a value that is closer to the above pressure loss than to zero. In cases where heavy clogging, which hampers the flow of the hydrogen-containing gas in the recycle flow passage 4, is regarded as abnormal clogging in the recycle flow passage 4, the second threshold value is set to a value that is closer to zero than to the above pressure loss.

It should be understood that the second threshold value is not necessarily limited to the above values but may be set to any value as long as it allows detection of an abnormal clogging in the portion of the recycle flow passage 4.

Thus, in the hydrogen generator 100 of the first embodiment, the abnormality detector 7 can detect an abnormal clogging in the portion of the recycle flow passage 4 which is located upstream of the pressure detector 6 by closing the on-off valve 5. On the other hand, when the on-off valve 5 is opened, the abnormality detector 7 determines that the portion of the recycle flow passage 4 which is located downstream of the pressure detector 6 becomes clogged, if the pressure value detected by the pressure detector 6 is equal to or higher than a third threshold value. This enables the abnormality detector 7 to detect abnormal clogging that occur in the overall region of the recycle flow passage 4.

As the third threshold value, a value, which is higher than a pressure value in the downstream end of the recycle flow passage 4 and equal to or lower than a pressure value in the upstream end of the recycle flow passage 4, is set. The third threshold value may be set to, for example, a value that is equal to or lower than a minimum value of pressure in the upstream end of the recycle flow passage 4 and higher than a pressure value in the downstream end of the recycle flow passage 4 when the pressure in the upstream end has the minimum value. This enables detection of an abnormal clogging irrespective of the amount of the raw material supplied from the raw material supply device 3 to the reformer 2.

It should be understood that the third threshold value is not necessarily limited to the above values but may be set to any value as long as it enables determination as to the presence or absence of an abnormal clogging in the portion of the recycle flow passage 4 which is located downstream of the pressure detector 6.

Although not mentioned in the operation flows associated with FIGS. 2 and 3, the operation of the hydrogen generator 100 may be stopped upon detection of an abnormal clogging by the abnormality detector 7.

If an abnormal clogging is detected in the recycle flow passage 4 by the abnormality detector 7, the generation of the hydrogen-containing gas by the reformer 2 may be once stopped and restarted after performing recovery operation for relieving the clogging.

In addition, the hydrogen generator 100 may be designed such that it is brought to an emergency stop and inhibited to start operation, if detection of an abnormal clogging in the recycle flow passage 4 by the abnormality detector 7, a recovery operation subsequent to the abnormal clogging detection, and generation of the hydrogen-containing gas by the reformer 2 subsequent to the recovery operation are repeated a plurality of times.

Further, if no abnormality is detected after making the abnormality detection, the on-off valve 5 is opened and the generation of the hydrogen-containing gas by the reformer 2 may be continued. In this situation, it is preferable to reduce the time during which the on-off valve 5 is closed, because closing of the on-off valve 5 causes the flow of the hydrogen-containing gas in the recycle flow passage 4 to be forcibly stopped. In view of this, the abnormality detector 7 may be designed such that if normal condition is determined in the abnormality detection (that is, if the pressure value is determined to be equal to or higher than the first threshold value), the abnormality detector 7 opens the on-off valve 5 before elapse of the abnormality determination time. The "abnormality determination time" stated herein is the preset time required to determine the presence or absence of an abnormal clogging in the recycle flow passage 4, and the abnormality detector 7 determines the presence or absence of an abnormal clogging in this preset time, while the pressure detector 6 is continuously detecting pressure.

During detection of an abnormal clogging by the abnormality detector 7, an abnormality in the recycle flow passage 4 can be more easily detected as the amount of the hydrogen-containing gas generated in the hydrogen generator increases. Therefore, a control operation may be performed during the abnormal clogging detection in order to incase the amount of the hydrogen-containing gas.

First Modification

Next, a modification of the hydrogen generator 100 of the first embodiment will be described.

The hydrogen generator according to the first modification of the first embodiment is configured such that, the abnormality detector closes the on-off valve in its open state, before the reformer starts generation of the hydrogen-containing gas and detects the presence or absence of an abnormal clogging based on a pressure detected by the pressure detector after the closing of the on-off valve.

The above abnormal clogging detection may be effected, for example, prior to or during temperature rising of the reformer. The abnormal clogging detection prior to the temperature rising may be effected during an initial check for determining if an abnormality is present in the devices that constitute the hydrogen generator. The above timing for the abnormal clogging detection is merely one example and the abnormal clogging detection may be effected any time as long as it is effected prior to a start of generation of the hydrogen-containing gas in the reformer.

This modification is designed to effect detection of an abnormal clogging in the recycle flow passage before the reformer starts generation of the hydrogen-containing gas, and therefore an abnormality can be detected at an earlier stage compared to the abnormal clogging detection of the hydrogen generator of the first embodiment.

The hydrogen generator according to the first modification has the same configuration as of the hydrogen generator according to the first embodiment and therefore only the abnormality detecting operation of the abnormality detector will be explained in the following description.

Figure 4:
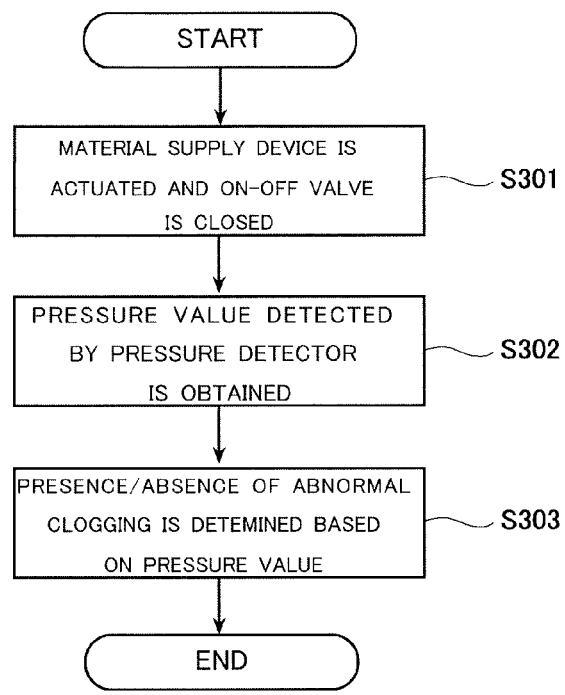
FIG. 4 is a flow chart showing one example of the schematic operation of a hydrogen generator according to a first modification of the first embodiment.

FIG. 4 is a flow chart showing one example of the schematic operation of the hydrogen generator according to the first modification of the first embodiment.

As shown in FIG. 4, the abnormality detector 7 closes the on-off valve 5 while bringing the raw material supply device 3 into operation, before the reformer 2 starts generation of the hydrogen-containing gas (STEP S301). Then, the abnormality detector 7 obtains a pressure value detected by the pressure detector 6 (STEP S302) and determines the presence or absence of an abnormal clogging in the recycle flow passage 4 based on the obtained pressure value (STEP S303).

More specifically, the abnormality detector 7 determines the presence or absence of an abnormal clogging in the recycle flow passage 4 by determining whether the pressure value obtained at STEP S302 is lower than the first threshold value at STEP S303, similarly to the first embodiment. Although the first modification has been described with a case where the abnormality detector 7 determines the presence or absence of an abnormal clogging in the recycle flow passage 4 by the absolute value of pressure, the first modification is not limited to this but may be such that the abnormal clogging determination by the abnormality detector 7 is based on the variation width of the value of pressure like the first embodiment.

If it is determined that no abnormal clogging is present, the hydrogen generator 100 transits to the next operational state where the reformer 2 starts operation such as the temperature rising or hydrogen-containing gas generating operation. If it is determined that an abnormal clogging is present, the hydrogen generator 100 may stop its operation without starting the next operation such as the temperature rising or hydrogen-containing gas generating operation of the reformer 2.

As the difference in pressure between upstream and downstream ends of the recycle flow passage 4 when detecting an abnormal clogging becomes more significant, less error occurs during the abnormal clogging detection. Therefore, the abnormality detector 7 may control the raw material supply device 3 so as to push the raw material into an upstream side of the recycle flow passage 4 under a pressure equal to or higher than a specified pressure during the abnormal clogging detection. This leads to an increase in the accuracy of the abnormal clogging detection.

Second Modification

A hydrogen generator according to a second modification of the first embodiment is configured such that after the reformer stops generation of the hydrogen-containing gas, the abnormality detector closes the on-off valve in its open state and determines the presence or absence of an abnormal clogging based on a pressure detected by the pressure detector after the closing of the on-off valve.

The state described herein where the reformer stops generation of the hydrogen-containing gas is defined as a state where the supply of at least either the raw material or water to the reformer is stopped.

In such a configuration, an abnormal clogging in the recycle flow passage is detected after the reformer stops generation of the hydrogen-containing gas.

The hydrogen generator according to the second modification has the same configuration as of the hydrogen generator according to the first embodiment and therefore only the abnormality detecting operation of the abnormality detector will be explained in the following description.

Figure 5:
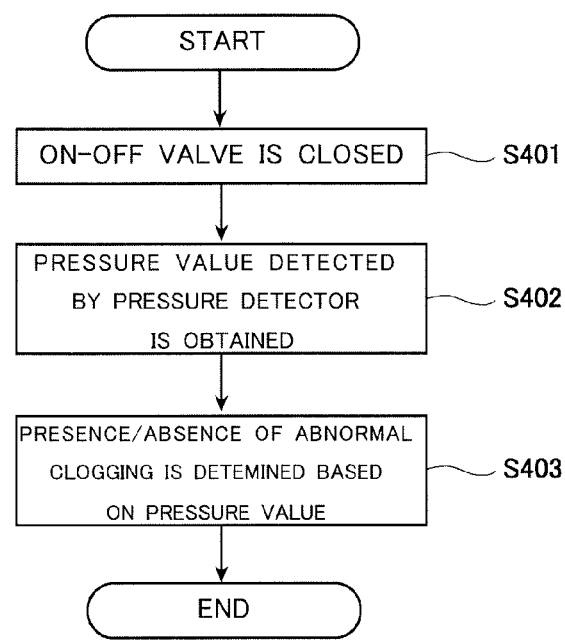
FIG. 5 is a flow chart showing one example of the schematic operation of a hydrogen generator according to a second modification of the first embodiment.

FIG. 5 is a flow chart showing one example of the schematic operation of the hydrogen generator according to the second modification of the first embodiment.

As shown in FIG. 5, the abnormality detector 7 closes the on-off valve 5 after the reformer 2 stops generation of the hydrogen-containing gas (STEP S401). Then, the abnormality detector 7 obtains a pressure value detected by the pressure detector 6 (STEP S402) and determines the presence or absence of an abnormal clogging in the recycle flow passage 4 based on the obtained pressure value (STEP S403).

More specifically, the abnormality detector 7 determines the presence or absence of an abnormal clogging in the recycle flow passage 4 by determining whether the pressure value obtained at STEP S402 is lower than the first threshold value at STEP S403, similarly to the first embodiment. Although the second modification has been described with a case where the abnormality detector 7 determines the presence or absence of an abnormal clogging in the recycle flow passage 4 by the absolute value of pressure, the second modification is not limited to this but may be such that the abnormal clogging determination by the abnormality detector 7 is based on the variation width of the value of pressure as stated earlier.

Second Embodiment

A hydrogen generator according to a second embodiment is constructed by modifying any one of the hydrogen generators according to the first embodiment and the modifications thereof in such a manner that the hydrogen generator includes a throttle section provided in the recycle flow passage and the pressure detector is located at a position downstream of the throttle section.

This configuration makes it possible to easily detect an abnormal clogging in the throttle section of the recycle flow passage, where an abnormal clogging is likely to occur. The hydrogen generator of the second embodiment may have the same configuration as of any one of the hydrogen generators of the first embodiment and the modifications thereof except the feature described above.

Configuration of Hydrogen Generator

Figure 6:
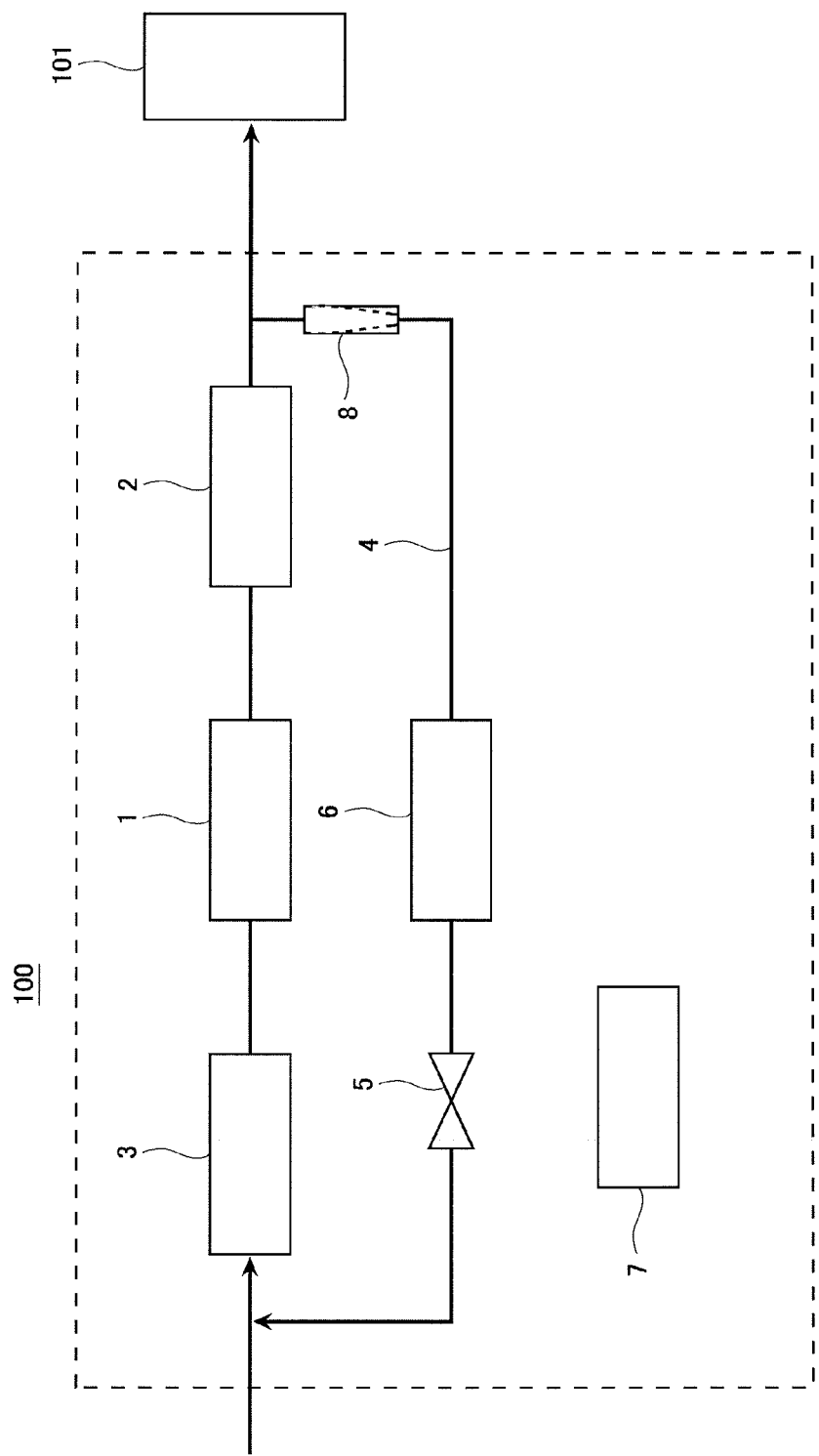
FIG. 6 is a conceptual diagram showing one example of the schematic configuration of a hydrogen generator according to a second embodiment.

FIG. 6 is a conceptual diagram showing one example of the schematic configuration of the hydrogen generator according to the second embodiment.

In the example shown in FIG. 6, the hydrogen generator 100 of the second embodiment includes the hydro-desulfurizer 1, the reformer 2, the raw material supply device 3, the recycle flow passage 4, the on-off valve 5, the pressure detector 6, the abnormality detector 7 and a throttle section 8.

The throttle section 8 is located in the recycle flow passage 4. The throttle section 8 is configured such that the flow rate of the hydrogen-containing gas flowing in the recycle flow passage 4 can be adjusted by making the flow passage cross sectional area of the throttle section 8 smaller than those of the portions of the recycle flow passage 4 which are located upstream and downstream of the throttle section 8. The throttle section 8 may be of any configuration as long as its flow passage cross sectional area is smaller than those of the portions of the recycle flow passage 4 which are located upstream and downstream of the throttle section 8. The throttle section 8 may be constituted by a pipe thinner than the pipe that constitutes the recycle flow passage 4 or a plate member having a hole thinner than the pipe that constitutes the recycle flow passage 4.

Operation of Hydrogen Generator

Next, the operation of the second hydrogen generator 100 will be described by way of example.

The operation of the hydrogen generator according to the second embodiment is similar to that of the hydrogen generator of the first embodiment and therefore only the distinguishing feature thereof will be described with reference to FIG. 6.

In the hydrogen generator 100 of this embodiment, during generation of the hydrogen-containing gas by the reformer 2, a pressure (hereinafter referred to as "a throttle section upstream side pressure") equivalent to a pressure in the upstream end of the recycle flow passage 4 is applied in a portion of the recycle flow passage 4 which is located upstream of the throttle section 8. In contrast with this, a pressure (hereinafter referred to as "a throttle section downstream side pressure") equivalent to a pressure in the downstream end of the recycle flow passage 4 is applied in a portion of the recycle flow passage 4 which is located downstream of throttle section 8. Therefore, the flow rate of the hydrogen-containing gas flowing in the throttle section 8 is determined depending upon the difference between the throttle section upstream side pressure and the throttle section downstream side pressure.

In cases where the throttle section 8 is not clogged, after the abnormality detector 7 closes the on-off valve 5 to effect abnormal clogging detection, the throttle section 8 downstream side pressure and the throttle section 8 upstream side pressure become equal to and come into equilibrium with each other, so that the flow of the hydrogen-containing gas in the throttle section 8 stops. Then, the pressure detected by the pressure detector 6, which value was closer to the value of pressure in the downstream end of the recycle flow passage 4 before starting the abnormal detecting operation, rises to a value close the value of pressure in the upstream end of the recycle flow passage 4. With the rise in pressure, the abnormality detector 7 can confirm that the pressure detected by the pressure detector 6 is equal to or higher than the first threshold value and determine that no abnormal clogging is present.

In cases where the throttle section 8 is clogged, the throttle section 8 downstream side pressure does not rise but is kept at a value closer to the value of pressure on the downstream end of the recycle flow passage 4, even when the abnormality detector 7 closes the on-off valve 5 to effect abnormality detection. The abnormality detector 7 confirms from this that the pressure detected by the pressure detector 6 is lower than the first threshold value and therefore determines that an abnormal clogging has occurred.

Third Embodiment

A hydrogen generator according to a third embodiment is constructed by modifying any one of the first embodiment, the modifications of the first embodiment, and the second embodiment and includes a buffer section disposed on a portion of the recycle flow passage which is located downstream of the on-off valve.

This configuration makes it possible to prevent a hydrogen concentration of a mixture of the raw material supplied to the hydro-desulfurizer and the recycled gas from decreasing to a value which is not higher than a specified value, even when the flow of the hydrogen-containing gas in the recycle flow passage is temporarily stopped by closing the on-off valve during the operation of detecting an abnormal clogging in the recycle flow passage. The hydrogen generator of the third embodiment may have the same configuration as of any one of the hydrogen generators of the first embodiment and the modifications of the first embodiment, and the second embodiment, except the feature described above.

Configuration of Hydrogen Generator

Figure 7:
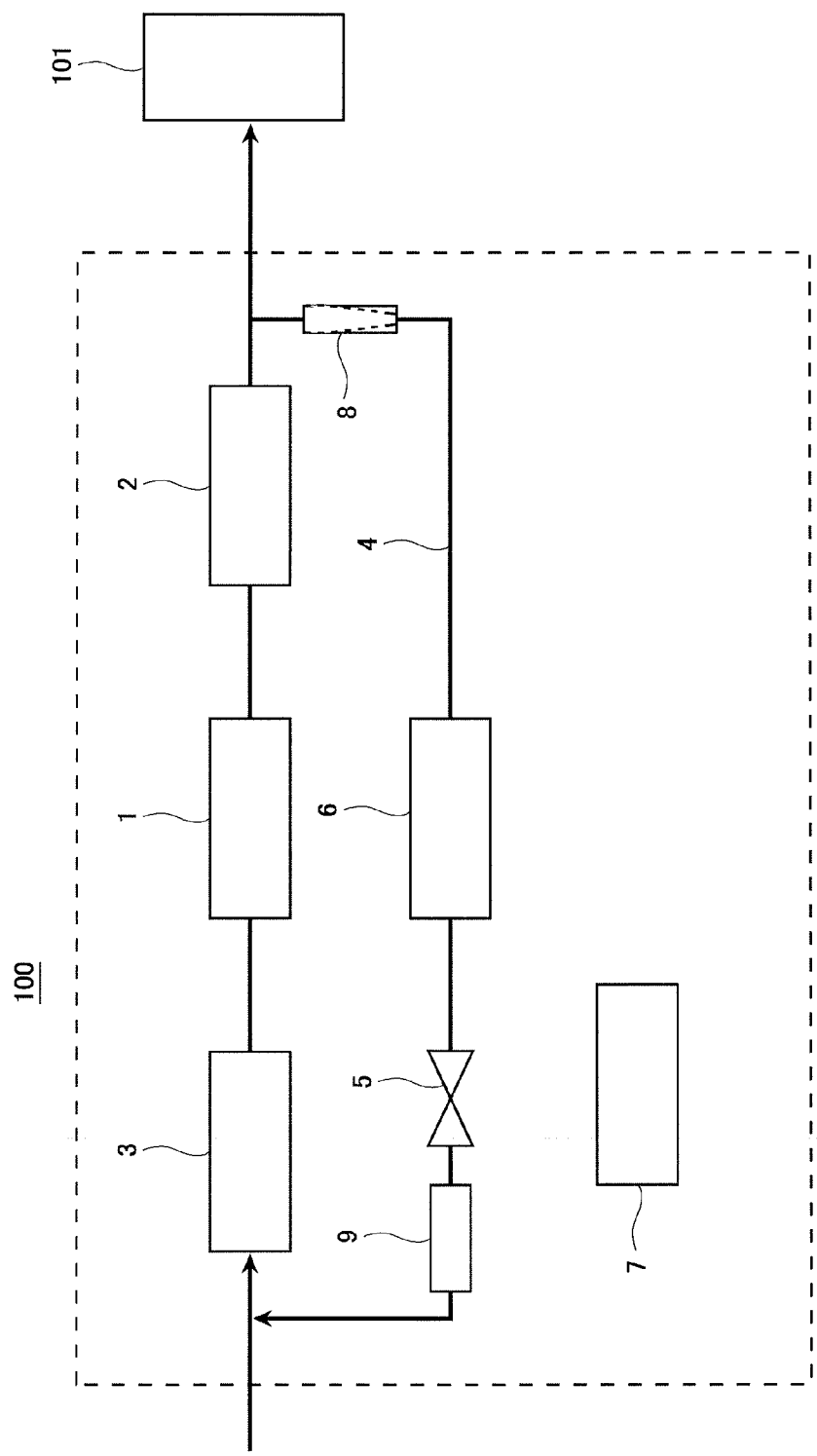
FIG. 7 is a conceptual diagram showing one example of the schematic configuration of a hydrogen generator according to a third embodiment.

FIG. 7 is a conceptual diagram showing one example of the schematic configuration of the hydrogen generator according to the third embodiment.

In the example shown in FIG. 7, the hydrogen generator 100 of the third embodiment includes the hydro-desulfurizer 1, the reformer 2, the raw material supply device 3, the recycle flow passage 4, the on-off valve 5, the pressure detector 6, the abnormality detector 7, the throttle section 8 and a buffer section 9.

The buffer section 9 is provided in the recycle flow passage 4. The buffer section 9 is disposed on a portion of the recycle flow passage 4 which is located downstream of the on-off valve 5, in a direction of the flow of the hydrogen-containing gas flowing in the recycle flow passage 4. This buffer section 9 enables continuous supplying of the hydrogen-containing gas to the hydro-desulfurizer 1 during the time for which the flow of the hydrogen-containing gas within the recycle flow passage 4 is stopped with the on-off valve 5 closed. The buffer section 9 may have any configuration such as a tank configuration or elongated pipe configuration as long as it can hold the hydrogen-containing gas in an amount corresponding to a time period during the closing of the on-off valve 5.

Operation of Hydrogen Generator

Next, the operation of the hydrogen generator 100 of the third embodiment will be described by way of example.

The operation of the hydrogen generator according to the third embodiment is similar to that of the hydrogen generator of the second embodiment and therefore only the distinguishing feature thereof will be described with reference to FIG. 7.

After closing the on-off valve 5 in the abnormality detecting operation, the flow of the hydrogen-containing gas in the recycle flow passage 4 stops during the closing of the on-off valve 5. In the hydrogen generator 100 of the third embodiment, the buffer section 9 pools the hydrogen-containing gas while the on-off valve 5 is opened, which gas is to be supplied to the hydro-desulfurizer 1. Because of the pooled hydrogen-containing gas, the supplying of the hydrogen-containing gas to the hydro-desulfurizer 1 can be continued even when the on-off valve 5 is closed, so that the hydro-desulfurizer 1 and the reformer 2 located downstream thereof can be prevented from deteriorating. The supplying of the hydrogen-containing gas stored in the buffer section 9 to the hydro-desulfurizer 1 is thought to be caused by dispersion.

The capacity of the buffer section 9 is determined by the length of time during which the on-off valve 5 is closed and the amount of hydrogen required for the hydro-desulfurizer 1. A throttle section such as a fixed orifice may be provided on a portion of the recycle flow passage 4 which is located downstream of the buffer section 9. This causes a difference in pressure between the buffer section 9 and the downstream end of the recycle flow passage 4, which makes it easy to supply the hydrogen-containing gas stored in the buffer section 9 to the hydro-desulfurizer 1.

Fourth Embodiment

A hydrogen generator according to a fourth embodiment is constructed by modifying any one of the first embodiment, the modifications of the first embodiment, the second embodiment and the third embodiment and includes a controller for executing a process for relieving a clogging in the recycle flow passage if the abnormality detector detects an abnormal clogging in the recycle flow passage.

In such a configuration, if the abnormality detector detects a clogging in the recycle flow passage, the controller relieves the clogging in the recycle flow passage. The hydrogen generator of the fourth embodiment may have the same configuration as of any one of the hydrogen generators of the first embodiment, the modifications of the first embodiment, the second embodiment, and the third embodiment except the feature described above.

Configuration of Hydrogen Generator

Figure 8:
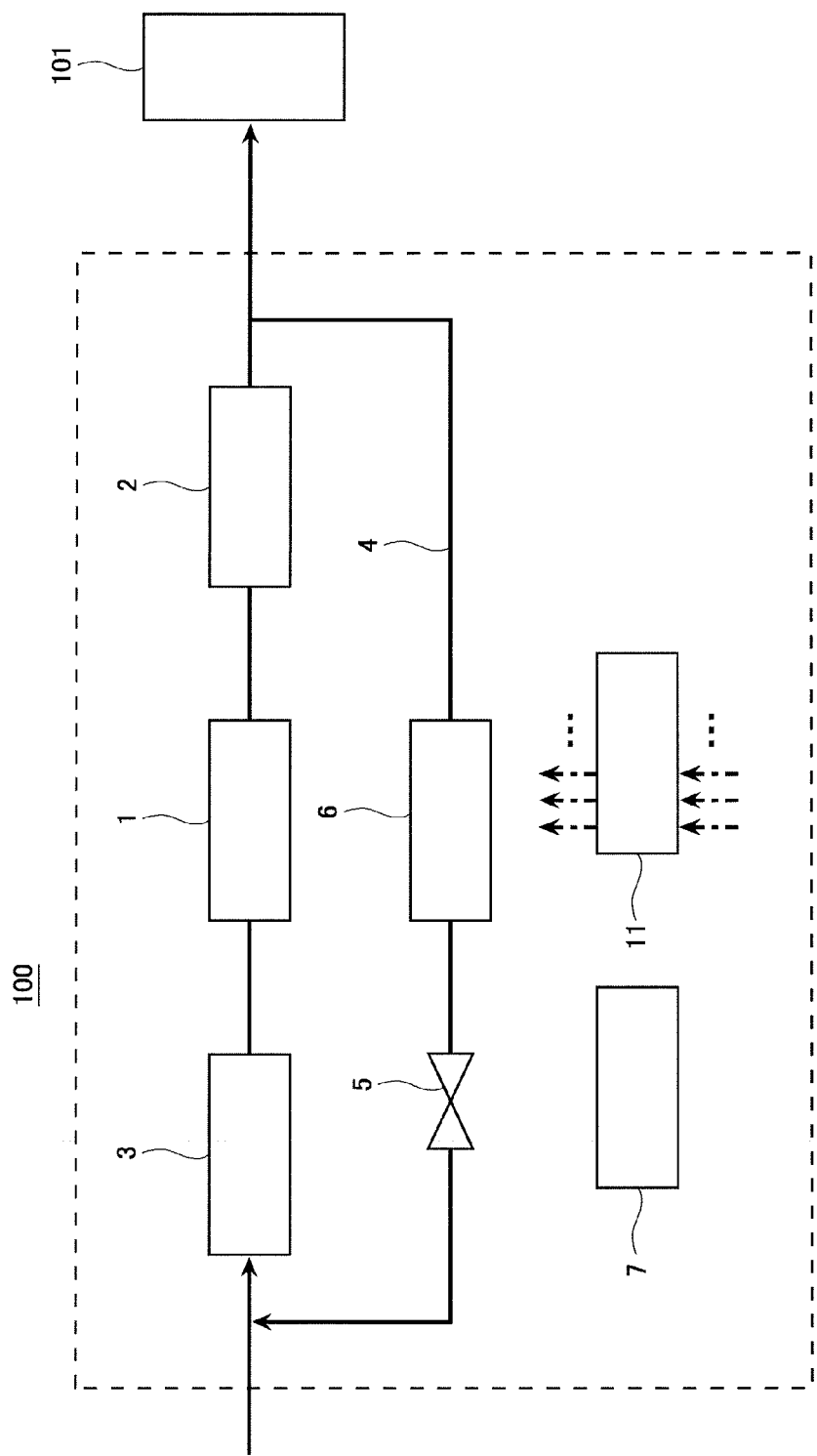
FIG. 8 is a conceptual diagram showing one example of the schematic configuration of a hydrogen generator according to a fourth embodiment.

FIG. 8 is a conceptual diagram showing one example of the schematic configuration of the hydrogen generator according to the fourth embodiment.

In the example shown in FIG. 8, the hydrogen generator 100 of the fourth embodiment includes the hydro-desulfurizer 1, the reformer 2, the raw material supply device 3, the recycle flow passage 4, the on-off valve 5, the pressure detector 6, the abnormality detector 7 and a controller 11.

If the abnormality detector 7 detects an abnormal clogging in the recycle flow passage 4, the controller 11 executes a process for relieving the clogging in the recycle flow passage 4. The controller 11 controls a device (such as the raw material supply device 3) that is required to operate when executing the process for relieving an abnormal clogging in the recycle flow passage 4 and includes an arithmetic operation unit and a storage unit for storing a control program (both units are not shown).

Representative examples of the arithmetic operation unit include MPU and CPU. Representative examples of the storage unit include memories. The controller 11 may consist of a single controller for performing centralized control or may be constituted by a plurality of controllers that cooperate with each other to perform decentralized control. The fourth embodiment has been described with a case where the controller 11 and the abnormality detector 7 are constructed separately, but the fourth embodiment is not limited to this. The controller 11 may also serve as the abnormality detector 7.

Operation of Hydrogen Generator

Next, the operation of the hydrogen generator 100 according to the fourth embodiment will be described by way of example.

The operation of the hydrogen generator according to the fourth embodiment is similar to that of the hydrogen generator of the first embodiment and therefore only the distinguishing feature thereof will be described with reference to FIG. 8.

If the abnormality detector 7 detects an abnormal clogging in the recycle flow passage 4, the controller 11 executes a process for relieving the clogging in the recycle flow passage 4. Concretely, the controller 11 controls the hydrogen generator 100 such that the output of the reformer 2 (i.e., the generated amount of hydrogen) increases. More specifically, the controller 11 controls the raw material supply device 3 such that the flow rate of the raw material supplied to the reformer 2 increases.

This makes it possible to increase the pressure in the recycle flow passage 4 to push out a foreign substance that clogs the recycle flow passage 4, so that the clogging in the recycle flow passage 4 can be relieved.

Since the above process makes it possible to relieve the abnormal clogging in the recycle flow passage 4, there is no need for the maintenance operator to dash to a job site and relieve the abnormal clogging from the recycle flow passage 4.

First Modification

Next, a hydrogen generator according to a modification of the fourth embodiment will be described.

The hydrogen generator according to the first modification of the fourth embodiment includes a notification device for notifying that a process for relieving the clogging in the recycle flow passage is in execution.

Configuration of Hydrogen Generator

Figure 9:
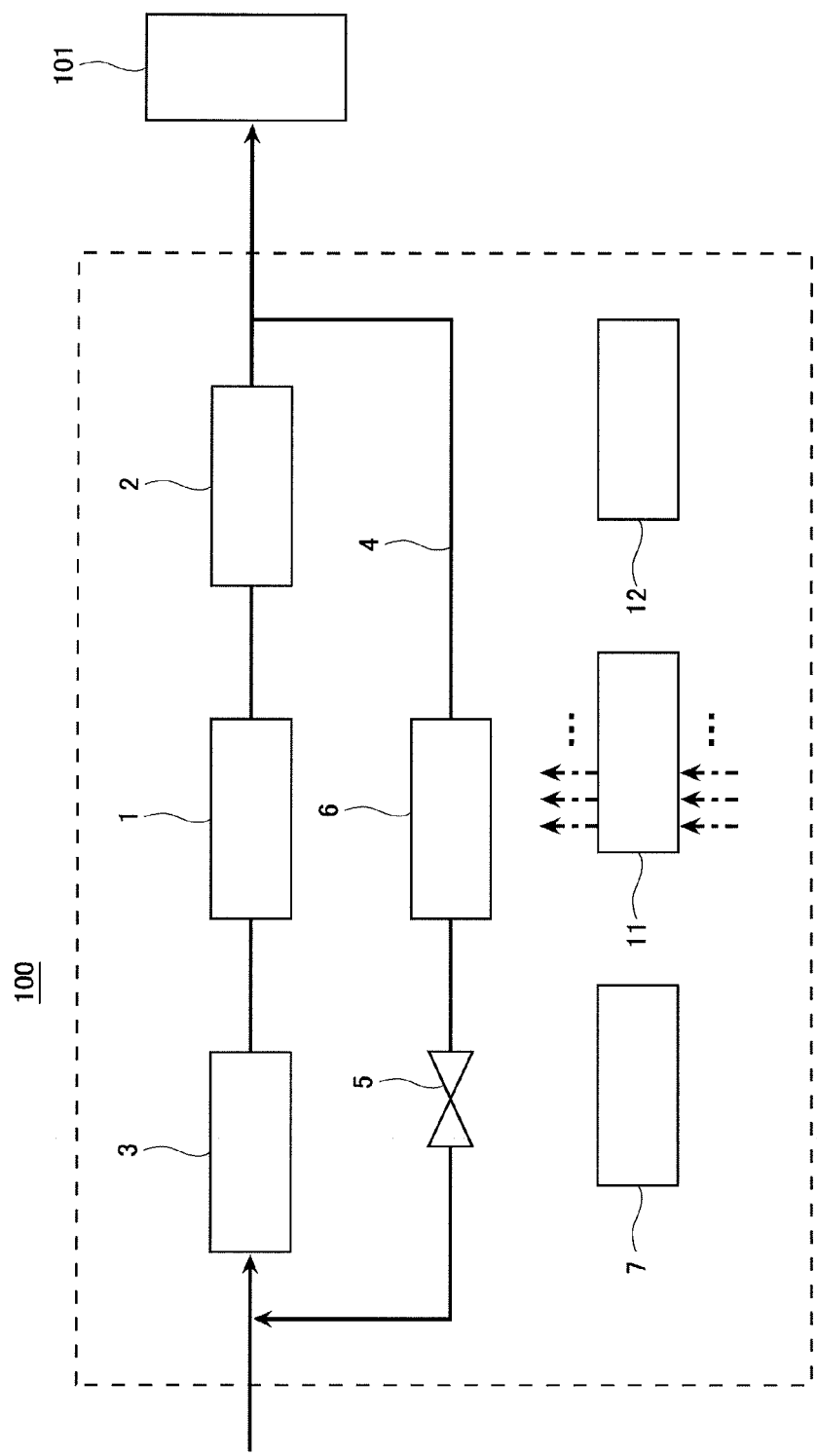
FIG. 9 is a conceptual diagram showing one example of the schematic configuration of a hydrogen generator according to a first modification of the fourth embodiment.

FIG. 9 is a conceptual diagram showing one example of the schematic configuration of the hydrogen generator according to the first modification of the fourth embodiment.

In the example shown in FIG. 9, the hydrogen generator 100 according to the first modification of the fourth embodiment includes the hydro-desulfurizer 1, the reformer 2, the raw material supply device 3, the recycle flow passage 4, the on-off valve 5, the pressure detector 6, the abnormality detector 7, the controller 11 and a notification device 12.

The notification device 12 may have any configuration as long as it can provide a message to the outside, notifying that the process for relieving a clogging in the recycle flow passage 4 is being executed. Such a message sent to the outside may be in the form of, for example, character data, image data or the like displayed on a display unit (screen) of a remote controller; voice information transmitted by means of e.g., a speaker; or optical or color information. Also, such a message may be in the form of a mail or application transmitted to a smart phone, cellular phone, tablet PC or the like over a communication network.

Operation of Hydrogen Generator

Next, the operation of the hydrogen generator 100 according to the first modification of the fourth embodiment will be described by way of example.

The operation of the hydrogen generator according to the first modification of the fourth embodiment is similar to that of the hydrogen generator of the fourth embodiment and therefore only the distinguishing feature thereof will be described with reference to FIG. 9.

If the abnormality detector 7 detects an abnormal clogging in the recycle flow passage 4, the controller 11 executes a process for relieving the clogging in the recycle flow passage 4. After the controller 11 starts execution of the process for relieving the clogging in the recycle flow passage 4, the notification device 12 sends a message to the outside, notifying that the process for relieving the clogging in the recycle flow passage 4 is in execution.

In cases where a target to which the message is transmitted is the user, the above configuration can relieve the user's anxiety even if the user becomes aware of an abnormality in the operation of the hydrogen generator 100, because the user is shortly informed of the execution of the above process so that he comes to know the reason why the hydrogen generator 100 is in abnormal operation.

In cases where a message indicative of the execution of the above process is sent to a maintenance service company, the company can be notified beforehand that there will soon arise a need for maintenance operation unless the abnormal clogging in the recycle flow passage 4 is relieved.

Fifth Embodiment

A hydrogen generator according to a fifth embodiment is constructed by modifying any one of the first embodiment, the modifications of the first embodiment, the second to fourth embodiments, and the modification of the fourth embodiment, and includes a notification device for notifying that an abnormal clogging has occurred in the recycle flow passage.

This configuration enables transmission of a message to the outside to inform that the hydrogen generator is in an abnormal state (i.e., an abnormal clogging has occurred in the recycle flow passage). As a result, the cause of the abnormal state of the hydrogen generator can be identified even though the hydrogen generator does not recover until the abnormality is relieved. The hydrogen generator of the fifth embodiment may have the same configuration as of any one of the hydrogen generators of the first embodiment, the modifications of the first embodiment, the second to fourth embodiments, and the modification of the fourth embodiment except the above feature. It should be noted that the notification device of the fifth embodiment may be constituted by a device that is the same as or different from the notification device of the modification of the fourth embodiment.

Configuration of Hydrogen Generator

Figure 10:
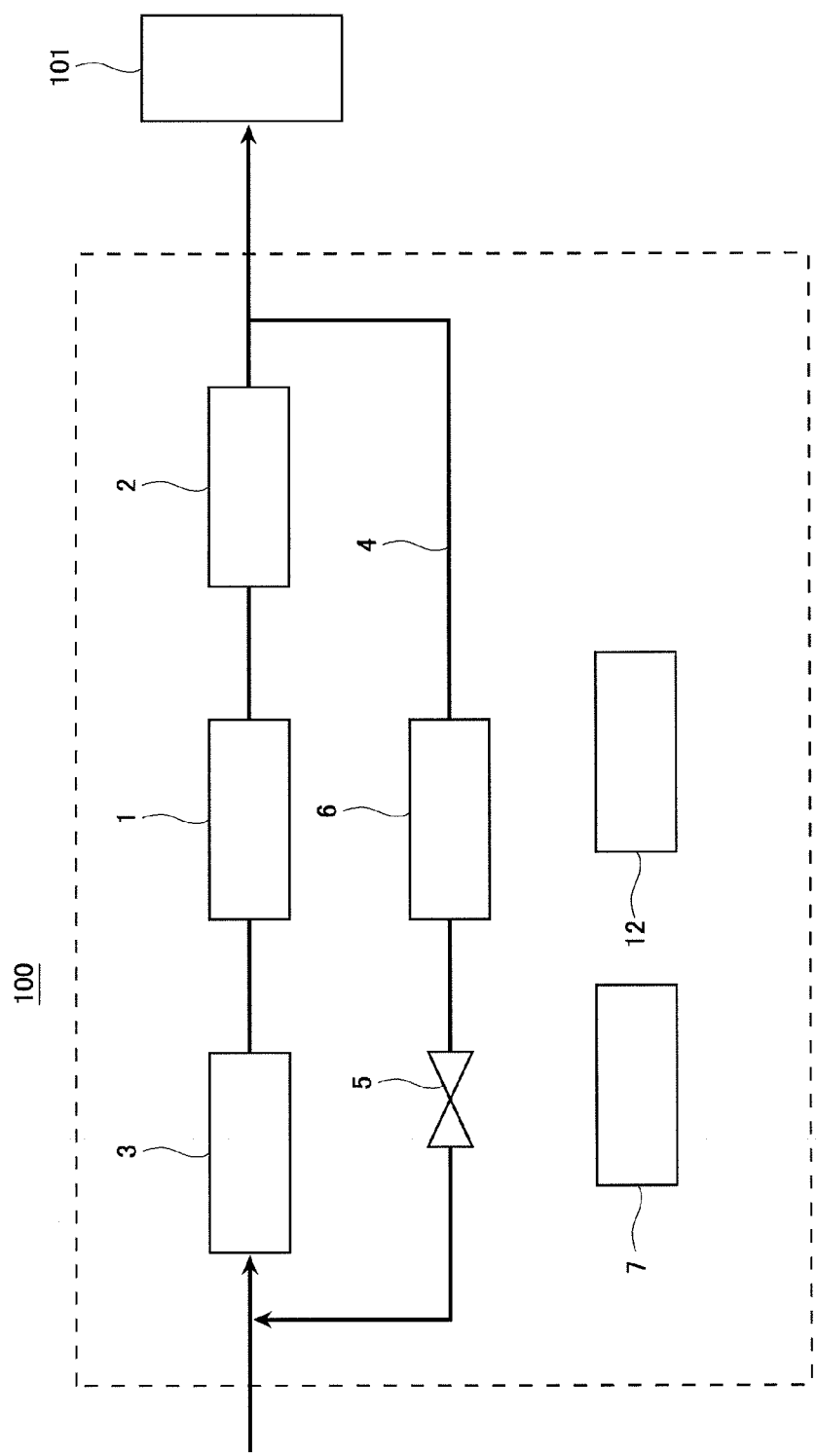
FIG. 10 is a conceptual diagram showing one example of the schematic configuration of a hydrogen generator according to a fifth embodiment.

FIG. 10 is a conceptual diagram showing one example of the schematic configuration of the hydrogen generator according to the fifth embodiment.

In the example shown in FIG. 10, the hydrogen generator 100 according to the fifth embodiment has the hydro-desulfurizer 1, the reformer 2, the raw material supply device 3, the recycle flow passage 4, the on-off valve 5, the pressure detector 6, the abnormality detector 7 and the notification device 12.

The notification device 12 may have any configuration as long as it can send a message to the outside to notify that an abnormality has occurred in the hydrogen generator 100 (i.e., an abnormal clogging has occurred in the recycle flow passage 4). Such a message sent to the outside may be in the form of, for example, character data, image data or the like displayed on a display unit (screen) of a remote controller; voice information transmitted by means of e.g., a speaker; or optical or color information. Also, such a message may be in the form of a mail or application transmitted to a smart phone, cellular phone, tablet PC or the like over a communication network.

Operation of Hydrogen Generator

The operation of the hydrogen generator 100 according to the fifth embodiment will be hereinafter described by way of example.

The operation of the hydrogen generator according to the fifth embodiment is similar to that of the hydrogen generator of the first embodiment and therefore only the distinguishing feature thereof will be described with reference to FIG. 10.

After the abnormality detector 7 has detected an abnormal clogging in the recycle flow passage 4, the notification device 12 sends a message to the outside to notify the occurrence of an abnormality in the hydrogen generator 100 (i.e., occurrence of an abnormal clogging in the recycle flow passage 4).

This makes it possible to relieve, for example, the anxiety of the user who wonders why the hydrogen generator 100 is not in operation.

In addition, in cases where a message indicative of occurrence of an abnormality is sent to a maintenance service company, the maintenance operator can dash to a job site immediately after the occurrence of the abnormality and repair the hydrogen generator 100 so that the hydrogen generator 100 can be immediately restored to restart its operation.

Sixth Embodiment

According to a sixth embodiment, there is provided a fuel cell system including: any one of the hydrogen generators according to the first embodiment, the modifications of the first embodiment, the second to fourth embodiments, the modification of the fourth embodiment and the fifth embodiment; and a fuel cell that generates electric power using hydrogen-containing gas supplied from the hydrogen generator.

In the above configuration, an abnormal clogging in the recycle flow passage 4 can be detected.

Figure 11:
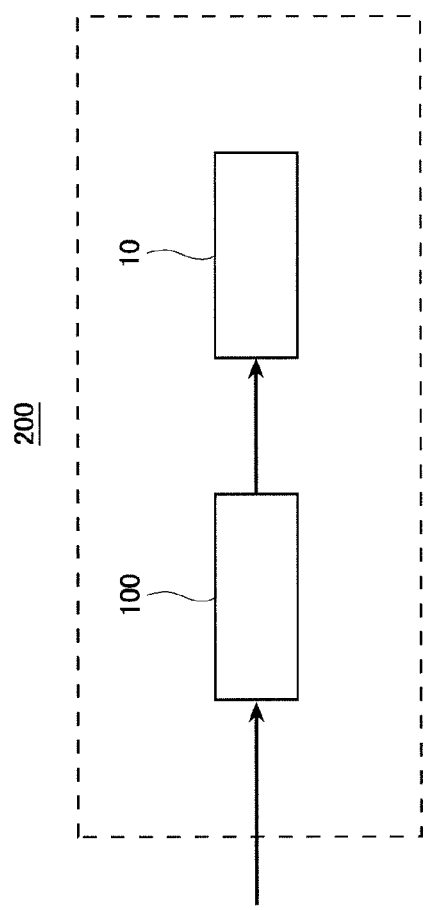
FIG. 11 is a conceptual diagram showing one example of the schematic configuration of a fuel cell system according to a sixth embodiment.

FIG. 11 is a conceptual diagram showing one example of the schematic configuration of the fuel cell system according to the sixth embodiment.

In the example shown in FIG. 11, a fuel cell system 200 according to the sixth embodiment includes the hydrogen generator 100 of the first embodiment and a fuel cell 10.

The fuel cell 10 generates electric power using hydrogen-containing gas supplied from the hydrogen generator 100. The fuel cell 10 may be of any type. For instance, a proton-exchange membrane fuel cell (PEFC), a solid oxide fuel cell or a phosphoric acid fuel cell may be used as the fuel cell 10.

During power generating operation, the fuel cell system 200 generates electric power using the hydrogen-containing gas supplied from the hydrogen generator 100. The operation of the hydrogen generator 100 according to this embodiment does not differ from that of the first embodiment when the fuel cell 10 is regarded as the hydrogen-utilizing device described in the first embodiment. Therefore, a detailed description of the operation is omitted herein.

Numerous modifications and alternative embodiments of the invention will be apparent to those skilled in the art in view of the foregoing description. Accordingly, the foregoing description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The hydrogen generator, hydrogen generator operating method and fuel cell system of the invention are capable of more easily detecting an abnormal clogging in the recycle flow passage, compared to the previous techniques.

REFERENCE SIGNS LIST

1: hydro-desulfurizer
2: reformer
3: raw material supply device
4: recycle flow passage
5: on-off valve
6: pressure detector
7: abnormality detector
8: throttle section
9: buffer section
10: fuel cell
11: controller
12: notification device
100: hydrogen generator
200: fuel cell system

The invention claimed is:

1. A hydrogen generator comprising:
a hydro-desulfurizer configured to remove sulfur compounds from a raw material;
a reformer configured to generate hydrogen-containing gas with use of the raw material that has passed through the hydro-desulfurizer;
a raw material supply device configured to supply the raw material to the reformer;
a recycle flow passage configured to supply a portion of the hydrogen-containing gas discharged from the reformer, to the raw material before the raw material flows into the hydro-desulfurizer;
an on-off valve provided in said recycle flow passage;
a pressure detector located at a position upstream of the on-off valve in the recycle flow passage; and
an abnormality detector configured to detect an abnormal clogging in the recycle flow passage based on a pressure detected by the pressure detector, in a state in which the raw material supply device is supplying the raw material to the reformer, with the on-off valve closed.

2. The hydrogen generator according to claim 1, wherein the abnormality detector closes the on-off valve in its open state in a state in which the reformer is generating the hydrogen-containing gas and detects an abnormal clogging based on a pressure detected by the pressure detector after the closing of the on-off valve.

3. The hydrogen generator according to claim 1, wherein the abnormality detector closes the on-off valve in its open state before the reformer starts generation of the hydrogen-containing gas and detects an abnormal clogging based on a pressure detected by the pressure detector after the closing of the on-off valve.

4. The hydrogen generator according to claim 1, wherein the abnormality detector closes the on-off valve in its open state after the reformer stops generation of the hydrogen-containing gas and detects an abnormal clogging based on a pressure detected by the pressure detector after the closing of the on-off valve.

5. The hydrogen generator according to claim 1, comprising a throttle section disposed in the recycle flow passage, and wherein the pressure detector is located downstream of the throttle section.

6. The hydrogen generator according to claim 1, comprising a buffer section in a portion of the recycle flow passage which is located downstream of the on-off valve.

7. The hydrogen generator according to claim 1, comprising a controller configured to execute a process for relieving an abnormal clogging in the recycle flow passage after the abnormality detector detects the abnormal clogging in the recycle flow passage.

8. The hydrogen generator according to claim 1, comprising a notification device configured to notify that an abnormal clogging has occurred in the recycle flow passage.

9. The hydrogen generator according to claim 7, comprising a notification device configured to notify that a process for relieving the clogging in the recycle flow passage is in execution.

10. A fuel cell system comprising:
the hydrogen generator recited in claim 1; and
a fuel cell configured to generate electric power using hydrogen-containing gas supplied from the hydrogen generator.

11. A method of operating a hydrogen generator comprising the steps of:
removing sulfur compounds from a raw material by a hydro-desulfurizer;
generating hydrogen-containing gas by a reformer, using the raw material that has passed through the hydro-desulfurizer;
supplying a portion of the hydrogen-containing gas which has been discharged from the reformer, through a recycle flow passage, to the raw material before the raw material flows into the hydro-desulfurizer;
detecting, by a pressure detector, a pressure in a portion of the recycle flow passage which is located upstream of an on-off valve provided in the recycle flow passage; and
detecting an abnormal clogging in the recycle flow passage based on the pressure detected by the pressure detector, in a state in which the raw material is being supplied to the reformer with the on-off valve closed.

* * * * *